United States Patent [19]

Ochiai et al.

[11] Patent Number: 5,296,989
[45] Date of Patent: Mar. 22, 1994

[54] HIGH DENSITY DUAL GAP MAGNETIC HEAD USING POLAR KERR EFFECT

[75] Inventors: Yoshitaka Ochiai; Hideki Matsuda, both of Kanagawa; Takehiro Nagaki, Miyagi; Shunichi Hashimoto, Kanagawa, all of Japan

[73] Assignee: Sony Corporation, Tokyo, Japan

[21] Appl. No.: 95,339

[22] Filed: Jul. 23, 1993

Related U.S. Application Data

[63] Continuation of Ser. No. 745,334, Aug. 15, 1991, abandoned.

[30] Foreign Application Priority Data

Aug. 24, 1990 [JP] Japan .................................. 2-224007

[51] Int. Cl.⁵ ...................... G11B 5/127; G11B 13/04
[52] U.S. Cl. ........................................ 360/114; 369/13
[58] Field of Search ............................ 360/114; 369/13

[56] References Cited

U.S. PATENT DOCUMENTS

| | | | |
|---|---|---|---|
| 4,707,755 | 11/1987 | Ohta et al. | 360/114 |
| 5,051,970 | 9/1991 | Ishii et al. | 369/13 |
| 5,070,487 | 12/1991 | Watson | 360/114 X |
| 5,216,643 | 6/1993 | Berg | 369/13 |
| 5,218,488 | 6/1993 | Berg | 360/114 X |

FOREIGN PATENT DOCUMENTS

| | | |
|---|---|---|
| 0159086 | 10/1985 | European Pat. Off. . |
| 0195628 | 9/1986 | European Pat. Off. . |
| 3644388 | 7/1987 | Fed. Rep. of Germany . |
| 57-183646 | 11/1982 | Japan . |

Primary Examiner—John H. Wolff
Attorney, Agent, or Firm—Hill, Steadman & Simpson

[57] ABSTRACT

A magnetic head comprising a magnetic path and a vertically magnetizable film. The magnetic path contains a first gap facing a magnetic recording medium and a second gap. The vertically magnetizable film is formed across the second gap on the principal plane or outer circumference of the magnetic path. A linearly polarized light beam is irradiated onto the vertically magnetizable film and the resulting reversal of magnetization in the vertically magnetizable film is detected through the use of a polar Kerr effect. This scheme allows data to be reproduced with sufficient sensitivity from tracks of very small widths.

14 Claims, 6 Drawing Sheets

FIG. 11
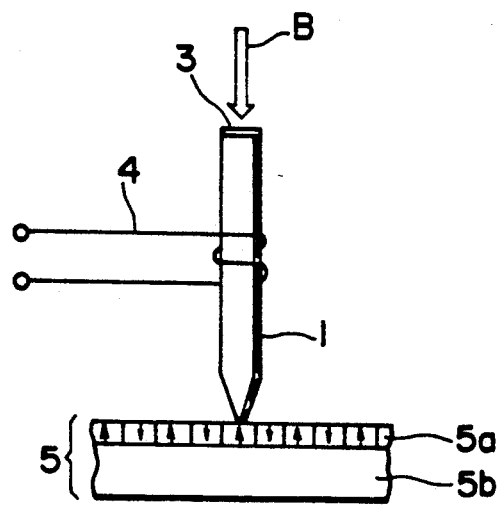
FIG. 13
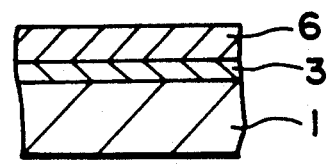
FIG. 12
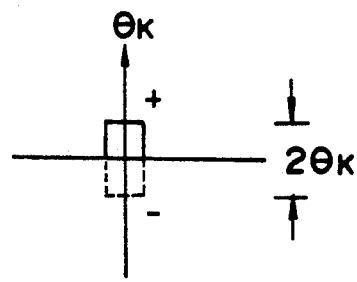
FIG. 14
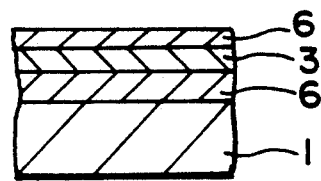
FIG. 15
FIG. 16
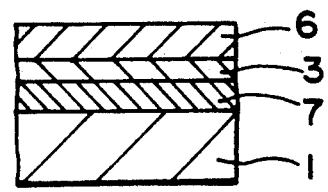

HIGH DENSITY DUAL GAP MAGNETIC HEAD USING POLAR KERR EFFECT

This is a continuation of application Ser. No. 07/745,334, filed Aug. 15, 1991, now abandoned.

BACKGROUND OF THE INVENTION

1. Field of the Invention

The present invention relates to a magnetic head and, more particularly, to a magnetic head which utilizes a magnetic optical effect to reproduce magnetic discs.

2. Description of the Prior Art

Conventionally used disc type recording media include magnetic discs (floppy discs and hard discs), optical discs (compact discs and laser discs) and magnetic optical discs. Of these discs, the magnetic disc has data recorded, reproduced and deleted thereto and therefrom through the use of a magnetic head. The recording reproducing and deleting of the data to and from the magnetic disc are most often performed using what is known as the magnetic induction method. One characteristic of the magnetic disc is its ability to have data overwritten on it. Because it relies on the magnetic induction method, the magnetic disc is required to have a track width as wide as tens of $\mu m$. It is difficult to reduce the track width as long as the magnetic induction method is utilized. Today, studies are under way on the so-called MR (magnetic resistance) head that operates on a magnetic resistance effect. However, even if the MR head is practically implemented, the track width involved is still expected to measure as large as several $\mu m$.

On the other hand, the optical disc and magnetic optical disc each measure 1.6 $\mu m$ in track width. The small track width intrinsically affords the optical or magnetic optical disc a high-density, high-capacity data storing capability. On the optical or magnetic optical disc, the diameter of a recording pit may be as small as 0.6 $\mu m$ when the laser beam used has a wavelength of 780 nm. If the wavelength of the laser beam is shortened, the spot diameter thereof may be made correspondingly smaller. This in turn will boost the recording density on the disc. Given the present state of the art, however, the shortwave laser beam ranging from the blue to outside the near velvet region is difficult to obtain; it is not yet practical to improve the recording density of the disc through the shortening of the laser beam wavelength. Unlike compact discs or laser discs, the magnetic optical disc has one distinct advantage: the latter disc allows data to be overwritten repeatedly on it. However, the speed at which to overwrite data or to gain access to the magnetic optical disc is yet to be improved for more practical use.

One notable property of the magnetic head is its ability to reduce the recording wavelength easily to 0.6 $\mu m$ or even less by shortening its gap length. If the biggest disadvantage of the magnetic disc, i.e., the large track width, is somehow resolved illustratively by an arrangement implied above, the recording density of the magnetic disc will be significantly improved.

With the magnetic head, the thickness of its magnetic layer facing a magnetic disc represents the track width. In this case, with the eddy current loss taken into account, a magnetic layer several $\mu m$ in thickness is expected to provide better I/O characteristics in the high frequency range ($>10$ MHz) than a magnetic layer tens of $\mu m$ thick. However, as described, the magnetic induction method based on a coil arrangement makes it very difficult to reproduce data from tracks whose width is several $\mu m$ or less. There is a possibility, as described, that the use of the MR head will allow data to be reproduced from tracks several $\mu m$ wide. But this is the limit; it is difficult to reproduce data from tracks of smaller widths using the prior art.

Of the methods for detecting the magnetized state of a magnetic substance, the method that works with the smallest magnetic substance thickness is that which utilizes magnetic optical effects such as the Kerr effect. This magnetic optical effect is a phenomenon in which a linearly polarized light beam incident on a magnetic substance has its plane of polarization rotated positively or negatively depending on the magnetized state of the substance. Although there have been reports on applying the magnetic optical effect to detecting the magnetized state of the magnetic head, all such applications are based on the longitudinal or traverse Kerr effect. Because the Kerr rotation angle derived from the longitudinal or traverse Kerr effect is intrinsically small, the reproduced signal output available thereby is low. This means that the use of the Kerr effect is not suitable in implementing a practical method of reproducing data from the magnetic disc.

SUMMARY OF THE INVENTION

It is therefore an object of the present invention to provide a magnetic head having sufficiently high sensitivity to reproduce data from tracks of very small widths.

In carrying out the invention and according to a first aspect thereof, there is provided a magnetic head comprising a ring type magnetic path 1 (this and other numerals below are reference characters in the accompanying drawings) and a vertically magnetizable film 3, the magnetic path 1 containing a first gap $G_1$ and a second gap $G_2$ facing a magnetic recording medium 5, the vertically magnetizable film 3 being formed on the principal plane or outer circumference of the magnetic path 1 and across the second gap $G_2$ thereof, wherein a linearly polarized light beam is irradiated to the vertically magnetizable film 3 so as to detect the reversal of magnetization in the film 3 by use of the polar Kerr effect.

According to a second aspect of the invention, there is provided a magnetic head comprising a magnetic path 1, one end of the magnetic path 1 facing a magnetic recording medium 5 and the other end thereof having a vertically magnetizable film 3 deposited thereon, wherein a linearly polarized light beam is irradiated to the vertically magnetizable film 3 so as to detect the reversal of magnetization in the film 3 by use of the polar Kerr effect.

The magnetic head according to the above-described first aspect of the invention has a magnetic field component contained in the leakage field close to the second gap $G_2$, the component being perpendicular to the surface of the vertically magnetizable film 3. The perpendicular leakage field component magnetizes the vertically magnetizable film 3. Meanwhile, the leakage field is reversed in accordance with the magnetized state of the magnetic recording medium 5. Thus when a linearly polarized light beam is irradiated to the vertically magnetizable film 3 and a polar Kerr rotation angle is detected therefrom, the reversal of magnetization in the vertically magnetizable film 3 may be detected. This phenomenon is utilized to reproduce data from the magnetic recording medium 5. In the case above, the polar Kerr effect provides larger rotation angles than the longitudinal or traverse Kerr effect. This affords a reproduced signal output of sufficient magnitude and hence sufficient sensitivity for data reproduction. Furthermore, the thickness of the magnetic path 1 facing the magnetic recording medium 5 effectively represents the track width. Because it is easy to reduce the magnetic path thickness to submicron dimensions, data may be reproduced from tracks of very small widths.

The magnetic head according to the above-described second aspect of the invention has the vertically magnetizable film 3 magnetized by the vertical magnetic field component that exists in the leakage field close to the edge of the magnetic path 1. As with the first aspect of the invention, the magnetization of the vertically magnetizable film 3 is reversed in accordance with the magnetized state of the magnetic recording medium 5. Thus when a linearly polarized light beam is irradiated to the vertically magnetizable film 3 and a polar Kerr rotation angle is detected therefrom, the reversal of magnetization in the vertically magnetizable film 3 may be detected. This phenomenon is utilized to reproduce data from the magnetic recording medium 5. In this case, too, the polar Kerr effect is utilized. This also permits data reproduction from the magnetic recording medium 5 with sufficient sensitivity. Likewise, the diameter of the magnetic path 1 facing the magnetic recording medium 5 effectively represents the track width. Because it is easy to reduce the magnetic path diameter to submicron dimensions, data may be reproduced from tracks of very small widths.

BRIEF DESCRIPTION OF THE INVENTION

FIG. 1 (B) is a front view of the first embodiment of the invention;

FIG. 1 (C) is a side view of the first embodiment of the invention;

FIG. 6 (B) is a front view of the second embodiment of the invention;

FIG. 6 (C) is a side view of the second embodiment of the invention;

FIG. 10 (B) is a front view of the third embodiment of the invention;

FIG. 11 is a front view of the third embodiment of the invention, illustrating how it is used to reproduce data from a magnetic disc;

FIG. 12 is a graphic representation of the polar Kerr rotation angle $\theta_K$ as it is distributed with the third embodiment of the invention FIGS. 13 through 16 are cross-sectional views showing how the polar Kerr rotation angle $\theta_K$ is enhanced with the first, second and third embodiments;

DESCRIPTION OF THE PREFERRED EMBODIMENT

Figure 1A:
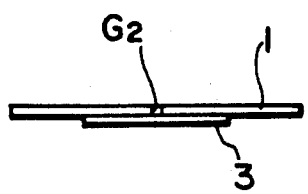
FIG. 1 (A) is a plan view of a ring type magnetic head incorporating a first embodiment of the present invention.

The preferred embodiments of the present invention will now be described with reference to the accompanying drawings. Like reference characters designate like or corresponding parts throughout the drawings.

Figure 1B:
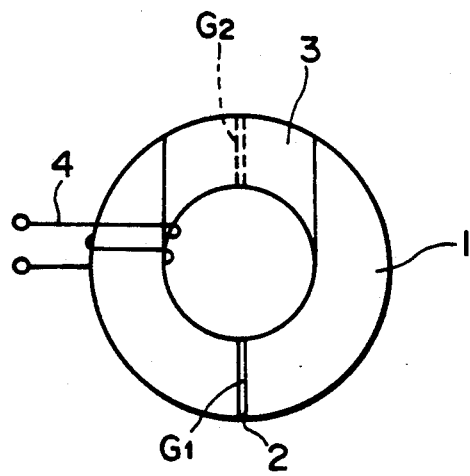
Figure 1C:
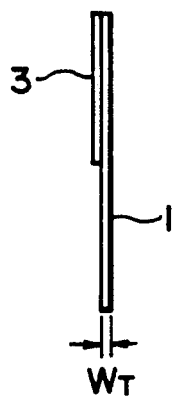

FIGS. 1 (A) through 1 (C) illustrate a ring type magnetic head incorporating a first embodiment of the invention. FIGS. 1 (A), 1 (B) and 1 (C) are a plan view, a front view and a side view of the first embodiment, respectively.

In FIGS. 1 (A) through 1 (C), reference character 1 is a ring type magnetic path having a predetermined thickness. The thickness of the ring type magnetic path 1 represents the track width $W_T$ of the magnetic disc to be used. The outer and inner diameters of the magnetic path 1 are illustratively about 30 and 20 $\mu$m, respectively, and the thickness thereof is illustratively about 0.2 to 0.3 $\mu$m. The ring type magnetic path 1 has a pair of gaps $G_1$ and $G_2$ 180 degrees apart. The gap $G_1$ faces the magnetic recording medium when the ring type magnetic head is in operation. The gaps $G_1$ and $G_2$ are illustratively 0.2 $\mu$m long each. These gaps have an insulation film 2 (e.g., $SiO_2$ film) deposited thereon.

The materials which compare the ring type magnetic path 1 are those having such characteristics as a high magnetic flux density B and a high magnetic permeability $\mu$, the characteristics being the same as those of ordinary soft magnetic materials. Suitable magnetic path materials include ferrite, permalloy, Sendust and noncrystal metals.

With the first embodiment of the invention, a vertically magnetizable film 3 of a predetermined shape is formed across the gap $G_2$ on a principal plane of the ring type magnetic path 1. The vertically magnetizable film 3 is a film whose material has a large polar Kerr rotation angle $\theta_K$ a high reflectance R and a low coercive force $H_c$. Specifically, the film 3 may be a multi-layer film constituted by a Co film and a Pt film, by a Co film and a Pd film, or by an Ni film and a Pt film; the film 3 may also be a Co-Pd alloy film. If the Co-Pt multi-layer or Co-Pd multi-layer film is used as the vertically magnetizable film 3, the Co-film should preferably be 2 to 8 angstroms thick, the thickness ratio of the Co film to the Pt or Pd film 0.8 or lower, and the entire multi-layer film thickness 500 angstroms or less. If the Ni-Pt multi-layer film is used as the vertically magnetizable film 3, the Ni film should preferably be 7 to 20 angstroms thick, the Pt film 2 to 6 angstroms in thickness, and the entire multi-layer film thickness 500 angstroms or less. If the Co-Pd alloy film is used as the vertically magnetizable film 3, the film thickness should preferably be 500 angstroms or less. in the Co-Pd alloy film, palladium (Pd) should preferably be 70 or more in terms of atomic percentage.

Reference character 4 denotes a recording coil. If the first, embodiment in the form of the ring type magnetic head is used only for data reproduction purposes only, the recording coil 4 may be omitted.

Below is a description of how data is reproduced from a magnetic disc by use of the first embodiment of the invention.

Figure 2:
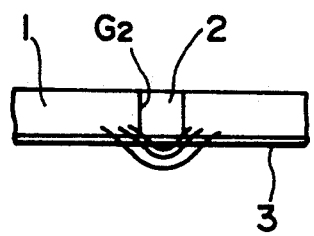
FIG. 2 is a partially enlarged plan view of the first embodiment, showing the leakage field close to the gaps thereof.

Referring to FIG. 2, the leakage field near the gap $G_2$ of the ring type magnetic head contains a magnetic field component perpendicular to the surface of the vertically magnetizable film 3 formed across the gap $G_2$. It is the perpendicular leakage field component that magnetizes the vertically magnetizable film 3. On the other hand, the leakage field close to the gap $G_2$ is magnetically reversed in accordance with the magnetized state of the magnetic disc. In turn, the vertically magnetizable film 3 is correspondingly reversed in magnetized state.

Figure 3:
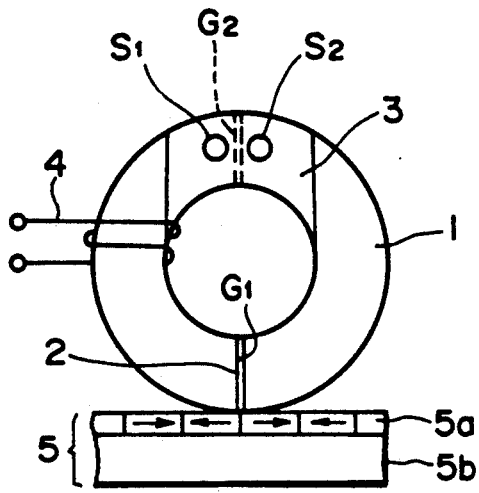
FIG. 3 is a front view of the first embodiment of the invention, illustrating how it is used to reproduce data from a magnetic disc.
Figure 4:
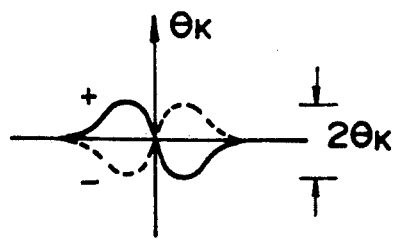
FIG. 4 is a graphic representation of a polar Kerr rotation angle $\theta_K$ as it is distributed with the first embodiment of the invention.

With the first embodiment, as shown in FIG. 3, a pair of linearly polarized light beams are irradiated to the surface of the vertically magnetizable film 3 at both ends of the gap $G_2$. ($S_1$ and $S_2$ denote the spots formed by irradiation of the light beams onto the vertically magnetizable film 3.) In the above setup, the polar Kerr rotation angle $\theta$ is detected in such a manner that the reversal of polarization will be detected in the vertically magnetizable film 3. In FIG. 3, reference character 5 is the magnetic disc, 5a is a recording film made of an in-plane magnetizable film, and 5b is a substrate. FIG. 4 graphically represents the polar Kerr rotation angle $\theta_K$ as it is distributed with the first embodiment of the invention. In this case, the magnetization of the vertically magnetizable film 3 is reversed in accordance with the magnetized state of the magnetic disc 5. Accordingly, the distribution of the polar Kerr rotation angle $\theta_K$ is also reversed. In FIG. 4, the curves in solid and broken lines correspond to the states before and after the reversal of magnetization in the vertically magnetizable film 3. Here, the polar Kerr rotation angle of the linearly polarized light beam identified by the spot $S_1$ is opposite in polarity but identical in absolute value to the polar Kerr rotation angle of the linearly polarized light beam identified by the spot $S_2$. Given the two angles, $+\theta_K$ on the one hand and $-\theta_K$ on the other-, the reversal of magnetization in the vertically magnetizable film 3 is represented by a signal corresponding to the difference $2\theta_K$ therebetween. This signal provides the reproduced signal output.

The foregoing description has dealt with the way to reproduce data from the magnetic disc. To record data onto the magnetic disc, the magnetic induction method is employed whereby a current is allowed to flow through the recording coil 4.

Figure 5:
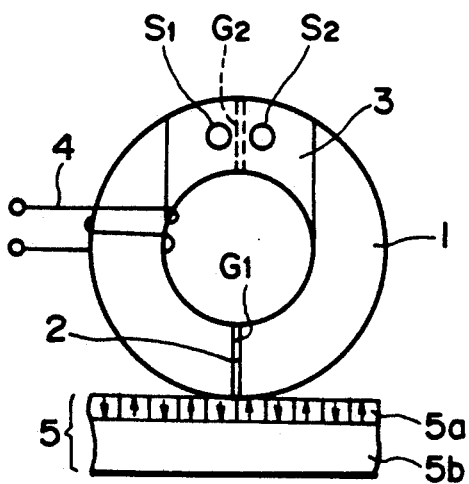
FIG. 5 is a front view of the first embodiment of the invention, depicting how it is used to reproduce data from a magnetic disc with a recording layer comprising a vertically magnetizable film.

Although FIG. 3 shows the case in which the recording film 5a of the magnetic disc 5 is an in-plane magnetizable film, reproducing and recording of data may also be carried out in the above-described manner where the recording film 5a is a vertically magnetizable film, as depicted in FIG. 5.

As described, the first embodiment involves having the vertically magnetizable film 3 irradiated by the linearly polarized light beams at the spots $S_1$ and $S_2$, the film 3 being formed across the gap $G_2$ over the principal plane of the ring type magnetic path 1. As the magnetized state of the magnetic disc varies, the magnetization of the vertically magnetizable film 3 is reversed accordingly. The reversal of magnetization in the film 3 is detected as a signal corresponding to $2\theta_K$. The signal thus detected provides a reproduced signal output of sufficient magnitude. This in turn allows data to be reproduced from the magnetic disc with sufficient sensitivity. Since the thickness of the ring type magnetic path 1 effectively represents the track width $W_T$, data may be reproduced from tracks having widths of as small as 0.2 μm. In this manner, the recording density of the magnetic disc is boosted significantly.

Figure 6A:
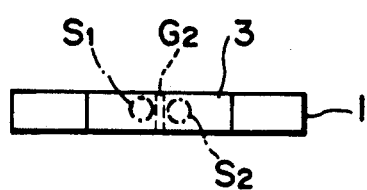
FIG. 6 (A) is a plan view of a ring type magnetic head incorporating a second embodiment of the invention.
Figure 6B:
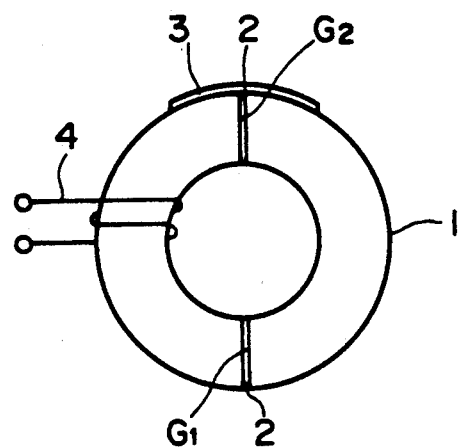
Figure 6C:
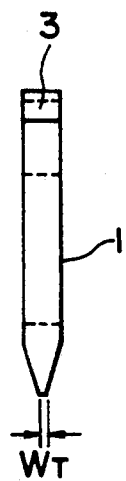

FIGS. 6 (A) through 6 (C) depicts another ring type magnetic head incorporating a second embodiment of the invention. FIGS. 6 (A), 6 (B) and 6 (C) are a plan view, a front view and a side view of the second embodiment, respectively.

With the second embodiment in the form of the ring type magnetic head shown in FIGS. 6 (A) through 6 (C), that part of the ring type magnetic path 1 which faces the magnetic disc is made thinner than the remaining parts thereof. That thinner part represents the track width $W_T$. In this case, the vertically magnetizable film 3 is formed across the gap $G_2$ on the outer circumference of the ring type magnetic path 1.

What follows is a description of how data is reproduced from the magnetic disc using the second embodiment of the invention.

Figure 7:
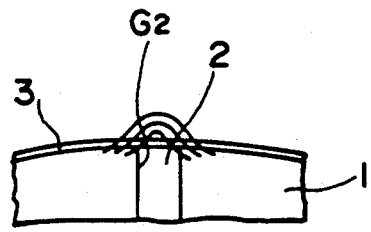
FIG. 7 is a partially enlarged plan view of the second embodiment, showing the leakage field close to the gaps thereof.

As illustrated in FIG. 7, near the gap $G_2$ of the ring type magnetic path 1 exists a leakage field component perpendicular to the surface of the vertically magnetizable film 3 formed across the gap $G_2$. The perpendicular leakage field component magnetizes the vertically magnetizable film 3. The magnetization of the vertically magnetizable film 3 is reversed in accordance with the magnetized state of the magnetic disc.

Figure 8:
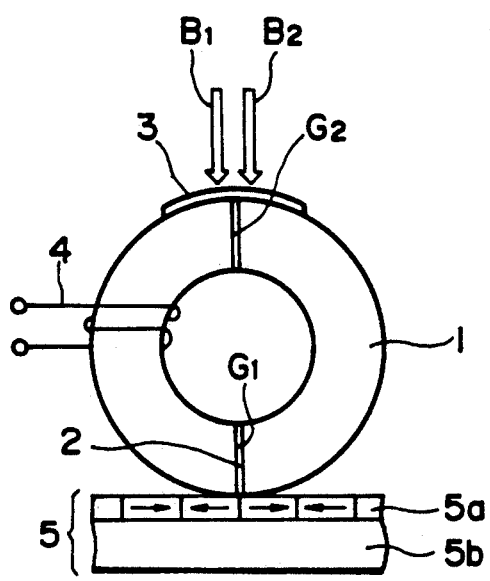
FIG. 8 is a front view of the second embodiment of the invention, illustrating how it is used to reproduce data from a magnetic disc.
Figure 9:
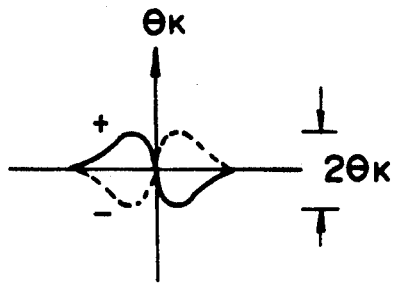
FIG. 9 is a graphic representation of the polar Kerr rotation angle $\theta_K$ as it is distributed with the second embodiment of the invention.

With the second embodiment, as shown in FIG. 8, linearly polarized light beams $B_1$ and $B_2$ are irradiated to the vertically magnetizable film 3 at both ends thereof. Then the polar Kerr rotation angle $\theta_K$ is detected out of the light beams $B_1$ and $B_2$. FIG. 6 (A) shows the spots $S_1$ and $S_2$ formed by the light beams on the vertically magnetizable film 3. The distribution of the polar Kerr rotation angle $\theta_K$ in the above case occurs as illustrated in FIG. 9, which is the same as shown in FIG. 4.

As with the first embodiment, the second embodiment also allows data to be reproduced from very narrow tracks with sufficient sensitivity.

Figure 10A:
FIG. 10 (A) is a plan view of a single magnetic pole type magnetic head incorporating a third embodiment of the invention.
Figure 10B:
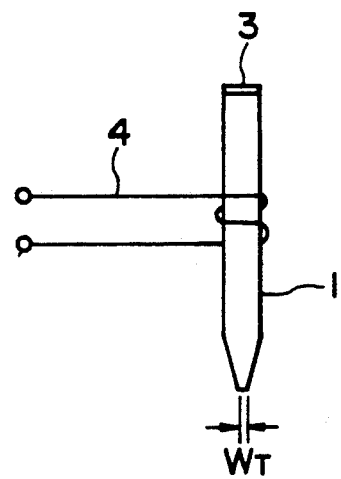

FIGS. 10 (A) and 10 (B) show a single magnetic pole type magnetic head incorporating a third embodiment of the invention. FIGS. 10 (A) and 10 (B) are a plan view and a front view of the third embodiment, respectively.

With the third embodiment in the form of the single magnetic pole type magnetic head depicted in FIGS. 10 (A) and 10 (B), the vertically magnetizable film 3 is formed on a pencil-shaped magnetic path 1 at one end thereof opposite to that which faces the magnetic disc.

In this case, the diameter of the tip of the pencil-shaped magnetic path 1 represents the track width $W_T$.

Below is a description of how data is reproduced from the magnetic disc using the third embodiment of the invention.

The vertically magnetizable film 3 formed at one end of the pencil-shaped magnetic path 1 is magnetized by a magnetic field component which exists in the leakage field near that end and which is perpendicular to that end. The magnetization of the vertically magnetizable film 3 is reversed in accordance with the magnetized state of the magnetic disc.

With the third embodiment, as shown in FIG. 11, the linearly polarized light beam B is irradiated to the vertically magnetizable film 3, and the polar Kerr rotation angle $\theta_K$ is detected therefrom. In FIG. 10 (A), reference character S denotes the spot formed by the linearly polarized light beam B on the vertically magnetizable film 3. FIG. 12 illustrates how the polar Kerr rotation angle $\theta_K$ is distributed with the third embodiment. In this case, too, the reversal of magnetization in the vertically magnetizable film 3 takes place in accordance with the magnetized state of the magnetic disc; the reversal is detected as a signal corresponding to $2\theta_K$. The signal thus detected provides the reproduced signal output whereby data is reproduced from the magnetic disc.

The third embodiment of the invention affords the same advantages as the first and the second embodiments. What follows is a description of how the polar Kerr rotation angle $\theta_K$ is enhanced with the first, second and third embodiments of the invention. FIGS. 13 through 16 illustrate typical arrangements for providing the enhancement.

In the arrangement of FIG. 13, the vertically magnetizable film 3 is formed on the magnetic path 1, the film 3 having a dielectric film 6 of a suitable thickness deposited thereon, whereby the polar Kerr rotation angle $\theta_K$ is enhanced.

In the arrangement of FIG. 14, the dielectric film 6 is formed on the magnetic path 1, the film 6 having a vertically magnetizable magnetic optical film 3 deposited thereon, whereby the polar Kerr rotation angle $\theta_K$ is enhanced.

In the arrangement of FIG. 15, a first dielectric film 6 is formed on the magnetic path 1, the film 6 having the vertically magnetizable film 3 deposited thereon, the film 3 in turn having a second dielectric film 6 deposited thereon, whereby the polar Kerr rotation angle 0K is enhanced.

In the arrangement of FIG. 16, a reflective film 7 is formed between the magnetic path 1 and the vertically magnetizable film 3 of FIG. 13 for enhancement of the polar Kerr rotation angle $\theta_K$. Although not shown, the arrangements of FIGS. 14 and 15 may also have the reflective film 7 formed between the magnetic path 1 and the dielectric film 6 for the same purpose.

Figure 17:
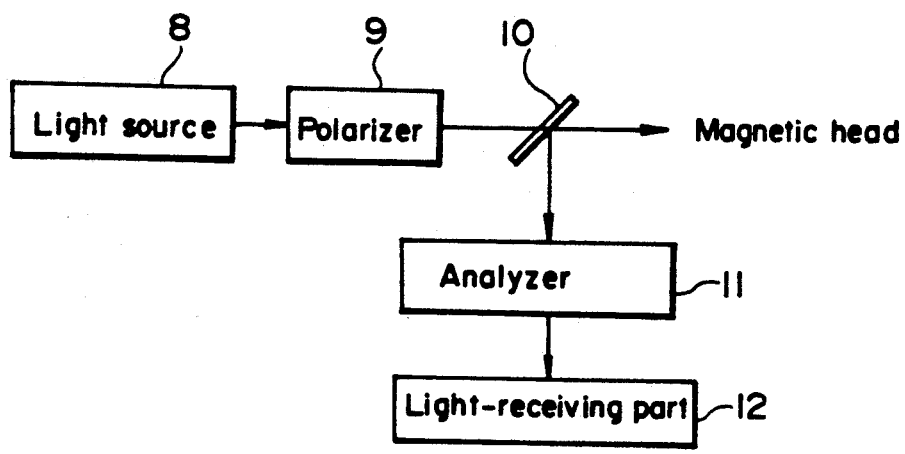
FIG. 17 is a block diagram of a typical data reproduction optics that uses an embodiment of the invention.

FIG. 17 is a block diagram of a typical data reproduction optical system that uses a magnetic head embodying the invention. In FIG. 17, a light source 8 is a laser diode (LD). Unlike data reproduction schemes for use with optical discs or magnetic optical discs, this data reproduction optics is not limited to using short wavelengths for the laser beam; any wavelength may be utilized. The laser beam generated by the light source 8 passes through a polarizer 9 to become a linearly polarized light beam. The linearly polarized light beam is incident on the vertically magnetizable film 3 formed on the magnetic path 1 of the magnetic head embodying the invention. When reflected by the vertically magnetizable film 3, the linearly polarized light beam produces rotary polarization $\theta_K$ due to the polar Kerr effect. The reflected light passes through an analyzer 11 before being detected by a light-receiving detector 12. The light-receiving detector 12 outputs a signal accordingly.

One way to implement the data reproduction optics is to employ a conventional pickup system for use with magnetic optical discs. In this case, however, the pickup system needs to be made smaller and more lightweight so as to reduce the access time thereof.

Another way to implement the data reproduction optics is to have the optics fixed and set an optical fiber arrangement to guide the linearly polarized light beam onto the vertically magnetizable film 3 of the magnetic head. Practiced in this way, the magnetic head is lightweight and is conducive to making the access time shorter. What is most desirable in the setup above is to have the data reproduction optics made of wave guide elements alone and integrated with the magnetic head. Small and light-weight, this optics arrangement offers a shorter access time characteristic and a better prospect for its mass production.

Figure 18:
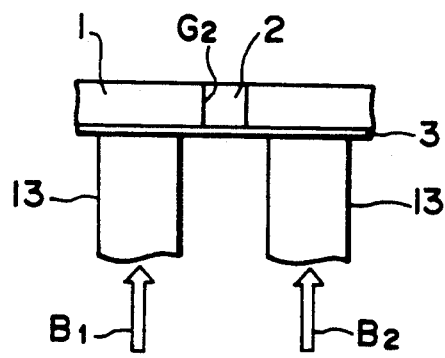
FIG. 18 is a partial plan view of a setup for guiding linearly polarized light beams using a optical fiber arrangement.

FIG. 18 illustrates how a pair of optical fiber cables 13 are used to guide linearly polarized light beams onto the vertically magnetizable film 3 in the first or second embodiment of the invention.

Figure 19:
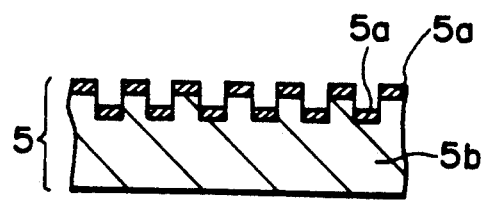
FIG. 19 is a cross-sectional view of a typical magnetic disc to which the embodiments of the invention may be applied.

The type of magnetic disc to which the magnetic head embodying the present invention applies is not limited to the conventionally utilized magnetic disc 5 mentioned above. Another applicable magnetic disc, shown in FIG. 19, has a recording film 5a deposited on a grooved substrate 5b. This type of magnetic disc eliminates cross talk through the use of the staggered groove structure on the disc surface.

In producing the prototype magnetic head according to the invention, the inventors used a target material 10 cm in diameter and having a composition of $(Fe_{0.5}Co_{0.5})_{55}Ni_{35}Cu_{10}$ for the magnetic path 1. Through magnetron sputtering in an argon gas atmosphere of $2 \times 10^{-3}$ Torr, an $(Fe_{0.5}Co_{0.5})_{55}Ni_{35}Cu_{10}$ film was formed over an $Al_2O_3 \cdot TiC$ substrate. The coercive force $H_c$ of the $(Fe_{0.5}Co_{0.5})_{55}Ni_{35}Cu_{10}$ film was 0.60 e for a film thickness of 2,000 angstroms.

The vertically magnetizable film 3 was produced using a Co target material and a Pt target material both 10 cm in diameter. The substrate was rotated and subjected to sputtering in an argon as atmosphere of $4 \times 10^{-3}$ Torr whereby a Co-Pt multi-layer film was formed on the substrate. The Co film was 2.7 angstroms in thickness, the Pt film 6.3 angstroms thick, and the total multi-layer film thickness 95 angstroms. The coercive force of the multi-layer film was 1,000 e. The polar Kerr rotation angle $\theta_K$ was 0.38 degrees when measured.

While preferred embodiments of the invention have been described using specific terms, such description is for illustrative purposes only and it is to be understood that changes and variations may be made without departing from the spirit or scope of the appended claims.

For example, the ring type magnetic path 1 of the first embodiment may be replaced with that of the second embodiment. Furthermore, the pencil-shaped magnetic path 1 of the third embodiment may be replaced with a flat type magnetic path.

The vertically magnetizable film 3 of the first or second embodiment may be produced in any shape as long as it is formed across the gap $G_2$. For example, the film 3 may be formed over the entire principal plane of the ring type magnetic path 1.

The first and the second embodiments of the invention operate on the rotating angle difference detection method described above. That is, a pair of linearly polarized light beams are irradiated to the vertically magnetizable film 3 so as to detect a signal representing the difference between the polar Kerr rotation angles of the two beams. Alternatively, a single linearly polarized light beam may be used and the polar Kerr rotation angle thereof detected as the signal.

As described and according to the invention, data is reproduced with sufficient sensitivity from tracks of very small widths.

It will be apparent that various modifications and/or additions may be made in the apparatus of the invention without departing from the essential feature of novelty involved, which are intended to be defined and secured by the appended claims.

What is claimed is:

1. A magnetic head comprising:
   a magnetic member in the form of a planar ring and defining a magnetic path having a first and a second gap, said first gap facing a magnetic recording medium; and
   a vertically magnetizable film formed across said second gap parallel to the plane of said ring;
   wherein the state of magnetization in said vertically magnetizable film is detected through the use of a polar Kerr effect, when a linearly polarized light beam is irradiated onto said vertically magnetizable film.

2. A magnetic head according to claim 1, wherein said vertically magnetizable film is a multi-layer film.

3. A magnetic head according to claim 2, wherein the total thickness of said multi-layer film is 500 angstroms or less.

4. The magnetic head according to claim 2, wherein said vertically magnetizable film comprises a multilayer film consisting of alternating layers of first and second metal films, said first metal films consisting of either Co or Ni, and said second metal films consisting of Pd or Pt.

5. The magnetic head according to claim 4, wherein said first and second metal films are formed of Co and Pt or Co and Pd, respectively, and the ratio of thickness of said second metal films to the thickness of said first metal films is $\leq 0.8$.

6. The magnetic head according to claim 4, wherein the reversal of magnetization detected in said light beam is $2\theta_K$ where $\theta_K$ is the angle of rotation of polarization of said light beam.

7. A magnetic head according to claim 1 or 4, further comprising a recording coil.

8. A magnetic head according to claim 1, further comprising:
   an optical fiber arrangement for guiding a linearly polarized light beam onto a vertically magnetizable film deposited on said magnetic head.

9. A magnetic head according to claim 1, further comprising:
   an optical fiber arrangement for guiding a linearly polarized light beam onto a vertically magnetizable film deposited on said magnetic head.

10. A magnetic head according to claim 9, further comprising a coil.

11. The magnetic head according to claim 1, including a dielectric film formed adjacent said vertically magnetizable film.

12. A magnetic head comprising:
    a magnetic member in the form of a planar ring and defining a magnetic path having a first and a second gap, said first gap facing a magnetic recording medium; and
    a vertically magnetizable film formed across said second gap on the outer circumference of said ring;
    wherein the state of magnetization in said vertically magnetizable film is detected through the use of a polar Kerr effect, when a linearly polarized light beam is irradiated onto said vertically magnetizable film.

13. A magnetic head according to claim 12, further comprising:
    an optical fiber arrangement for guiding a linearly polarized light beam onto a vertically magnetizable film deposited on said magnetic head.

14. The magnetic head according to claim 12, including a dielectric film formed adjacent said vertically magnetizable film.

* * * * *